UNITED STATES PATENT OFFICE.

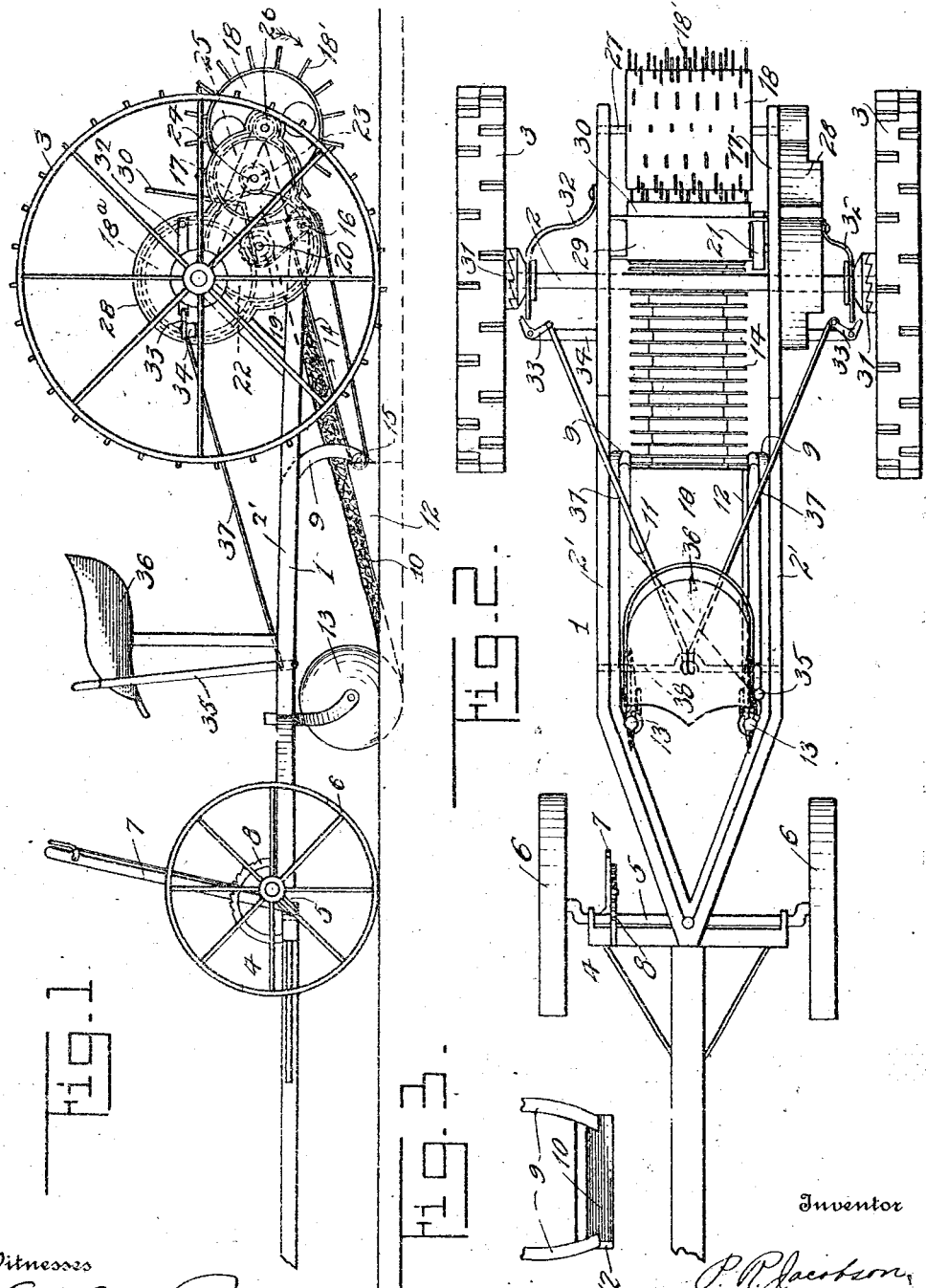

PETER R. JACOBSON, OF LAKE PARK, MINNESOTA.

GRASS-DESTROYING MACHINE.

1,114,618.   Specification of Letters Patent.   Patented Oct. 20, 1914.

Application filed February 24, 1914.   Serial No. 820,532.

*To all whom it may concern:*

Be it known that I, PETER R. JACOBSON, a citizen of the United States, residing at Lake Park, in the county of Becker and State of Minnesota, have invented certain new and useful Improvements in Grass-Destroying Machines, of which the following is a specification.

The present invention appertains to improvements in agricultural machinery and to that class designed for the purpose of extracting and destroying grass.

An object of this invention is to provide a toothed rotating member or drum which is adapted to act upon the turf of soil suitably cut and conveyed into contact therewith in such a manner as to separate the grass and its roots from the earth as the latter is dashed by the drum against an impact member, allowing the earth adhering to the grass to fall back upon the surface of the ground while the grass is thrown upon the top of the same from where it may readily be collected or destroyed through action of the elements.

A further object of this device lies in the provision of suitable means for releasing the driving connection of the rotating member to permit it to freely revolve upon sudden stoppage of the machine or in turning, eliminating likelihood of breakage due to quick take up of the movement of the device.

With the above and other objects in view, this invention consists in the construction, combination and arrangement of parts all as hereinbefore more fully described, claimed and illustrated in the accompanying drawings, wherein:

Figure 1 is a side elevation of a machine constructed in accordance with my invention. Fig. 2 is a top plan view of the same. Fig. 3 is a fragmentary rear elevation of the cutting member or plow employed in the construction.

Throughout the following detail description, and on the several figures of the drawings, similar parts are referred to by like reference characters.

Referring to the drawings as showing an embodiment of my device the numeral 1 designates a frame of any desired conformation, preferably rectangular in shape and mounted upon an axle or driving shaft 2 carrying the usual ground wheels 3. As shown in the drawing the frame is mounted at its rear portion upon the axle 2 while attached to its forward extremity is a suitable form of draft truck 4, the latter embodying adjusting means by which the frame 1 may be raised or lowered at its forward portion for the purpose of regulating the cutting action of a plow member forming a part of the machine, as will be more clearly described hereinafter. The axle 5 of the draft truck is bent intermediate its length adjacent the wheels 6 and a lever 7 engaging a notched segment 8 constitutes the adjusting means just mentioned and it will be obvious that movement of the lever 7 forwardly or rearwardly will raise or lower the frame with a reasonable degree of adjustment.

Depending from the side members 2' of the frame 1 are spaced bars 9 connected to opposite sides of a shovel or plow 10, which shovel is of any desired form but preferably one having a diagonally arranged cutting edge 11 and a land side 12. Immediately preceding the lateral edge portions of the plow I preferably employ the usual colters 13. Adjacent the rear extremity of the shovel 10 is mounted an endless conveyer 14 passing around suitable rollers 15 and 16 which conveyer inclines in substantial alinement with the surface of the shovel aforesaid, and is driven through the instrumentality of gearing by the axle 2. As shown most clearly in Fig. 1 of the drawing, the frame 1 has an auxiliary supporting frame at its rear extremity designated 17 in which frame is rotatably mounted a toothed drum 18. The rotating parts of this device as hereinbefore suggested are driven through the instrumentality of gears, a main driving gear 18ª being carried by the shaft 2 and meshing with a gear 19 on a short shaft 20 which also has at one extremity a pulley over which the belt 21 is disposed for driving the conveyer 14. The shaft 20 also has secured thereon a large gear 22 which intermeshes with a small gear 23 secured to a short shaft 24 and the latter shaft has also a large gear 25 adjacent the pinion 23 which intermeshes with a pinion 26 on the drum axle 27. It will thus be obvious that the drum is adapted to be rotated at high speed through the proper ratio of gears just described and also that the conveyer is caused to move at a speed which is properly proportional to the movement of the machine in acting upon the turf. A suitable casing 28 houses the gearing and also forms a support for the shafts 16, 20 and 24.

In the use of my device the machine is adapted to be drawn over the ground and the cutting member 10 is properly adjusted so that a layer of the earth is cut, the thickness of which depends upon the depth to which the roots of the grass have penetrated. This grass is sometimes termed "quick grass" and is well known to agriculturalists to be of considerable detriment in the cultivation of land. Usually the grass, however, may be destroyed or killed by exposing the same to the elements after extracting it from the ground or after the extracting action the grass upon the surface may be raked and the land thereby cleared. As the turf passes over the cutting element 10 it is carried by the conveyer 14 rearwardly of the machine until it reaches a point directly in front of the drum 18, which drum rotating at high speed, and through the instrumentality of its teeth 18′, tears up the material, the matted soil being forcibly thrown by the drum against an impact member or plate 29 situated above the upper portion of the conveyer 14 and beneath the axle 2. The earth is pulverized by the impact and falls back upon the ground while the grass and roots separated therefrom by the teeth of the drum are thrown by the latter over the same, in a direction rearwardly of the machine, where said grass falls upon the surface of the ground. Connected to and extending upwardly substantially vertically of the impact member 29 is a guard plate 30, the function of which is to prevent the material from being thrown toward the operator of the machine as will be apparent.

The speed of rotation of the drum 18 as well as the operation of the other moving members makes desirable some mechanism by which the same may be freed to continue to revolve when the machine has been brought to a sudden stop or where it is turned and for this purpose I have employed coöperating clutch members 31 on the axle 2 adjacent each of the ground wheels 3 and the moving element of the clutch member is normally held in driving engagement by means of springs 32. To release the clutches, a lever 33 supported on the arms 34 adjacent each of the clutch members is adapted to engage the springs 32 when the operating lever 35 arranged adjacent the operator's seat 36 on the frame 1 is moved forwardly, said levers being connected by means of links or rods 37 to a transverse supporting rod 38 to which the lever 35 is secured. The revolution of the drum and the conveyer will continue until they stop of their own accord and when the lever 35 is moved rearwardly the clutches again engage and cause shredding action hereinbefore described to be resumed.

Various changes may readily be made in the details of construction and arrangement of parts of this device without departing from the spirit of the invention, and within the scope of the appended claims. Such changes comprehend also the adaption of the machine comprising this invention for the purpose of breaking new lands and pulverizing the earth simultaneously with this operation as well as the employment of the apparatus for the digging of potatoes and the like, in which use the drum 18 may be removed.

Having thus described the invention, what I claim as my invention is:

1. In a grass destroying machine of the class described, the combination with a wheeled frame, of a plow member carried thereby for cutting a turf of soil, a toothed drum rotatably mounted on said frame against which the soil is directed, a conveyer disposed in rear of the plow member for conveying the soil to the drum, an impact plate supported by the frame above the rear portion of the conveyer member and intermediate the latter and the toothed drum, and means for rotating the conveyer and drum to cause the soil to be thrown upwardly by the latter as it leaves the conveyer against the impact plate aforesaid.

2. In a grass destroying machine of the class described, the combination with a wheeled frame, of a plow member carried thereby for cutting a turf of soil, a toothed drum rotatably mounted on said frame against which the soil is directed, a conveyer disposed in rear of the plow member for conveying the soil to the drum, an impact plate supported by the frame above the rear portion of the conveyer member and intermediate the latter and the toothed drum, means for rotating the conveyer and drum to cause the soil to be thrown upwardly by the latter as it leaves the conveyer against the impact plate aforesaid, and a guard plate connected to the impact plate and extending upwardly at an angle thereto in front of the rotatable drum.

In testimony whereof I affix my signature in presence of two witnesses.

PETER R. JACOBSON.

Witnesses:
CHARLES E. FOSS,
ERNEST FOLTZ.